(12) United States Patent
Edme et al.

(10) Patent No.: US 8,712,694 B2
(45) Date of Patent: Apr. 29, 2014

(54) COMBINING SEISMIC DATA FROM SENSORS TO ATTENUATE NOISE

(75) Inventors: Pascal Edme, Cambridge (GB); Everhard Muyzert, Girton (GB); Julian Edward (Ed) Kragh, Finchingfield (GB); Johan O. A. Robertsson, Grantchester (GB); Qinglin Liu, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 306 days.

(21) Appl. No.: 12/573,266

(22) Filed: Oct. 5, 2009

(65) Prior Publication Data

US 2011/0082647 A1 Apr. 7, 2011

(51) Int. Cl.
*G01V 1/36* (2006.01)

(52) U.S. Cl.
CPC .................................... *G01V 1/364* (2013.01)
USPC .......................................................... 702/17

(58) Field of Classification Search
CPC .......... G01V 1/36; G01V 1/364; G01V 1/366
USPC .................................... 702/17, 14; 367/21, 22
See application file for complete search history.

(56) References Cited

U.S. PATENT DOCUMENTS

| | | | |
|---|---|---|---|
| 3,722,751 A | 3/1973 | Bisciglia | |
| 3,934,218 A * | 1/1976 | Babb | 367/177 |
| 4,134,097 A * | 1/1979 | Cowles | 367/13 |
| 4,163,206 A | 7/1979 | Hall, Jr. | |
| 4,334,296 A | 6/1982 | Hall, Jr. | |
| 4,520,467 A | 5/1985 | Berni | |
| 4,554,648 A | 11/1985 | Greer et al. | |
| 4,558,439 A | 12/1985 | Gudesen | |
| 4,599,713 A | 7/1986 | Rudaz | |
| 4,890,264 A | 12/1989 | Crews | |
| 4,979,150 A * | 12/1990 | Barr | 367/24 |
| 4,996,675 A * | 2/1991 | Beauducel | 367/162 |
| 5,555,530 A * | 9/1996 | Meehan | 367/45 |
| 5,621,699 A * | 4/1997 | Rigsby et al. | 367/22 |
| 5,648,938 A * | 7/1997 | Jakubowicz | 367/56 |
| 5,757,720 A | 5/1998 | Soubaras | |

(Continued)

FOREIGN PATENT DOCUMENTS

| | | |
|---|---|---|
| EP | 0736781 A1 | 9/1996 |
| EP | 1454169 | 10/1996 |

(Continued)

OTHER PUBLICATIONS

Greensted, "The Lab Book Pages: Delay Sum Beamforming", Oct. 2012, The Lab Book Pages, pp. 1-9, http://www.labbookpages.co.uk/audio/beamforming/delaySum.html.*

(Continued)

*Primary Examiner* — Jonathan C. Teixeira Moffat
*Assistant Examiner* — Regis Betsch (57) ABSTRACT

To perform noise attenuation for seismic surveying, a sensor assembly is deployed on a ground surface, where the sensor assembly has a seismic sensor to measure seismic waves propagated through a subterranean structure, and a divergence sensor comprising a pressure sensor to measure noise. First data is received from the seismic sensor, and second data is received from the divergence sensor. The first data and the second data are combined to attenuate noise in the first data.

21 Claims, 4 Drawing Sheets

(56) References Cited

U.S. PATENT DOCUMENTS

| | | | |
|---|---|---|---|
| 6,314,371 B1 | 11/2001 | Monk | |
| 6,330,512 B1 | 12/2001 | Thomas et al. | |
| 6,381,544 B1* | 4/2002 | Sallas et al. | 702/17 |
| 6,442,304 B1* | 8/2002 | Crawley et al. | 385/12 |
| 6,446,009 B1* | 9/2002 | Baeten et al. | 702/17 |
| 6,584,038 B2* | 6/2003 | Meunier | 367/25 |
| 6,607,050 B2 | 8/2003 | He et al. | |
| 6,894,948 B2 | 5/2005 | Brittan et al. | |
| 6,932,185 B2* | 8/2005 | Bary et al. | 181/122 |
| 6,961,283 B2* | 11/2005 | Kappius et al. | 367/43 |
| 7,082,079 B2 | 7/2006 | Woo | |
| 7,142,481 B1 | 11/2006 | Metzbower | |
| 7,286,938 B2 | 10/2007 | Amundsen et al. | |
| 7,520,467 B2 | 4/2009 | Gioffre et al. | |
| 7,551,517 B2* | 6/2009 | Berg et al. | 367/149 |
| 7,916,576 B2 | 3/2011 | Beasley | |
| 2007/0104028 A1 | 5/2007 | Manen et al. | |
| 2008/0225641 A1 | 9/2008 | van Manen et al. | |
| 2009/0052277 A1 | 2/2009 | Swanson | |
| 2010/0100330 A1 | 4/2010 | Burkholder | |
| 2010/0265797 A1 | 10/2010 | Robertsson et al. | |
| 2010/0286922 A1 | 11/2010 | Poletto | |
| 2011/0080808 A1* | 4/2011 | Muyzert et al. | 367/43 |
| 2011/0082646 A1 | 4/2011 | Halliday et al. | |
| 2011/0085417 A1 | 4/2011 | Ronnow | |
| 2011/0085419 A1 | 4/2011 | Ronnow | |
| 2011/0141849 A1 | 6/2011 | Brittan | |
| 2012/0081999 A1 | 4/2012 | Halliday et al. | |

FOREIGN PATENT DOCUMENTS

| | | |
|---|---|---|
| EP | 1257849 | 11/2002 |
| FR | 2738642 A1 | 3/1997 |
| GB | 1256304 | 12/1971 |
| GB | 2456313 | 7/2009 |
| WO | 03036331 | 5/2003 |
| WO | 2005017563 | 2/2005 |

OTHER PUBLICATIONS

Dey et al., "Noise suppression on Geophone data using microphone measurements", Crewes, Research Report vol. 12 (2000) http://www.crewes.org/ForOurSponsors/ResearchReports/2000/2000-08.pdf.*

PCT Search Report, dated Apr. 28, 2011, Application No. PCT/US2010/051367.

Barr, et al., Attenuation of Water-col. Reverberations Using Pressure and Velocity Detectors in a Water-Bottom Cable, SEG Annual International, 1989.

Barr, Dual-Sensor OBC Technology, The Leading Edge, Jan. 1997, pp. 45-51, vol. 16.

De Meersman, et al., A Complex SVD-Polarization Filter for Ground Roll Attenuation on Multi-Component Data, EAGE 67th Conference and Exhibition, Jun. 13-16, 2005.

Edme, et al., Receiver Function Method in Reflection Seismology, Geophysical Prospecting, 2008, pp. 327-340, vol. 56.

Edme, et al., Receiver Function Decomposition of OBC Data:Theory, Geophysical Journal International, 2009, pp. 966-977, vol. 177.

Karsli, et al. Using the Wiener-Levison Algorithm to Supress Ground Roll, Journal of Applied Geophysics, 2004, pp. 187-197, vol. 55.

Kragh, et al., Ground Roll and Polarization, First Break, Sep. 1995, pp. 369-378, vol. 13, No. 9.

Robertsson, et al., Wavefield Separation using Densely Deployed Three-Component Single-Sensor Groups in Land Surface-Seismic Recordings, Geophysics, Sep.-Oct. 2002, pp. 1624-1633, vol. 67, No. 5.

U.S. Appl. No. 12/573,301, Final Rejection dated Jan. 22, 2013, pp. 1-26 and attachments.

U.S. Appl. No. 12/573,301, Final Rejection dated Oct. 24, 2012, pp. 1-19 and attachments.

U.S. Appl. No. 12/573,301, Non-Final Rejection dated Mar. 6, 2012, pp. 1-15 and attachments.

Criss, "Another look at full-wave seismic imaging," First Break, vol. 25, Jun. 2007 (8 pages).

U.S. Appl. No. 12/720,188, Notice of Allowance dated Apr. 24, 2013, pp. 1-6 and attachments.

U.S. Appl. No. 12/757,103, Notice of Allowance dated Apr. 26, 2013, pp. 1-3 and attachments.

International Search Report and Written Opinion for PCT Application No. PCT/US2010/051368 dated Apr. 28, 2011: pp. 1-11.

International Search Report and Written Opinion for PCT Application No. PCT/US2011/060328 dated Jun. 11, 2012: pp. 1-8.

Curtis et al., "Seismic interferometry—turning noise into signal," The Leading Edge, Sep. 2006: pp. 1082-1092.

Drijkoningen, "Design of Seismic Network in LOFAR: Testing at Exloo Test-Site," Jul. 2007: pp. 1-53.

Drijkoningen et al., "Project Plan of the Seismic Application in LOFAR," Sep. 2007: pp. 1-16.

Halliday et al., "Interferometric surface-wave isolation and removal," Geophysics, Sep.-Oct. 2007, vol. 72 (5): pp. A69-A73.

Digital Sensors, ION Geophysical, 2009, <http://iongeo.com/Land_Imaging/Digital_Sensors>.

Sensor Geophoness, ION Geophysical, 2009, <http://iongeo.com/Land_Imaging/Geophones>.

Snieder, "Extracting the Green's function of attenuating heterogeneous acoustic media from uncorrelated waves," J. Acoust. Soc. Am., May 2007, vol. 121(5): pp. 2637-2643.

Snieder et al., "Cancellation of spurious arrivals in Green's function extraction and the generalized optical theorem," Physical Review E, 2008, vol. 78: pp. 036606-1-036606-8.

Van Dalen et al., "G035: Characterization of Subsurface Parameters with Combined Fluid-Pressure and Particle-Velocity Measurements," 70th EAGE Conference & Exhibition, Jun. 9, 2008: pp. 1-5.

* cited by examiner

COMBINING SEISMIC DATA FROM SENSORS TO ATTENUATE NOISE

BACKGROUND

Seismic surveying is used for identifying subterranean elements, such as hydrocarbon reservoirs, freshwater aquifers, gas injection zones, and so forth. In seismic surveying, seismic sources are placed at various locations on a land surface or sea floor, with the seismic sources activated to generate seismic waves directed into a subterranean structure.

The seismic waves generated by a seismic source travel into the subterranean structure, with a portion of the seismic waves reflected back to the surface for receipt by seismic receivers (e.g., geophones, accelerometers, etc.). These seismic receivers produce signals that represent detected seismic waves. Signals from the seismic receivers are processed to yield information about the content and characteristic of the subterranean structure.

A typical land-based seismic survey arrangement includes deploying an array of seismic receivers on the ground with the seismic receivers provided in an approximate grid formation. The seismic receivers can be multi-component geophones that enable the measurement of an incoming wavefield in three orthogonal directions (vertical z, horizontal inline x, and horizontal crossline y).

For land-based seismic surveying, various types of unwanted wavefields may be present, including ground-roll noise, such as Rayleigh or Love surface waves. The unwanted wavefields can contaminate seismic data acquired by seismic receivers. Although various conventional techniques exist to remove unwanted wavefields from seismic data, such techniques are relatively complex and may be costly.

SUMMARY

In general, according to an embodiment, a method of noise attenuation for seismic surveying includes deploying a sensor assembly on a land surface, where the sensor assembly has a seismic sensor to measure seismic waves propagated through a subterranean structure, and a divergence sensor comprising a pressure sensor to measure noise. First data received from the seismic sensor and second data received from the divergence sensor are combined to attenuate noise in the first data.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, to attenuate noise in seismic data in a land-based survey arrangement, sensor assemblies each having at least one seismic sensor and at least one divergence sensor (for measuring noise) are employed. In some embodiments, the divergence sensor is formed using a container filled with a material in which a pressure sensor (e.g., a hydrophone) is provided. The pressure sensor in such an arrangement is able to record mainly noise, such that the data from the pressure sensor in the sensor assemblies can be used to develop a noise reference model for cleansing seismic data acquired by the seismic sensors. The material in which the pressure sensor is immersed can be a liquid, a gel, or a solid such as sand or plastic.

One type of noise is ground-roll noise. Ground-roll noise refers to seismic waves produced by seismic sources that travel generally horizontally along a ground surface towards seismic receivers. These horizontally traveling seismic waves, such as Rayleigh waves or Love waves, are undesirable components that can contaminate seismic data. Generally, "noise" refers to any signal component that is unwanted from seismic data (such as data representing reflected signals from subterranean elements). Other types of noise include flexural waves present in data acquired over frozen surfaces such as a body of water or permafrost; and airborne noise caused by the environment such as due to wind, rain, or human activity such as traffic, air blasts, flare noise or other industrial processes.

Figure 1:
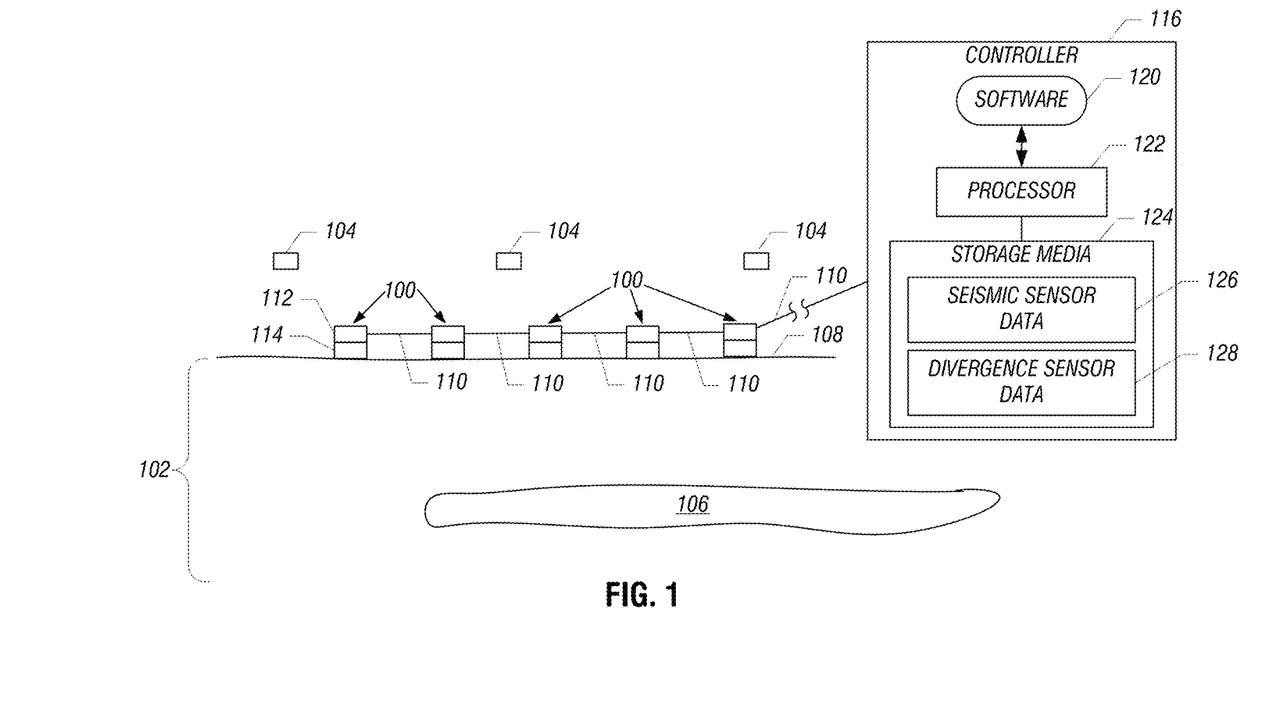
FIG. 1 is a schematic diagram of an example arrangement of sensor assemblies that can be deployed to perform a land-based seismic survey, according to an embodiment.

FIG. 1 is a schematic diagram of an arrangement of sensor assemblies 100 that are used for land-based seismic surveying. The sensor assemblies 100 are deployed on a ground surface 108 (in a row or in an array). A sensor assembly 100 being "on" a ground surface means that the sensor assembly 100 is either provided on and over the ground surface, or buried (fully or partially) underneath the ground surface such that the sensor assembly 100 is with 10 meters of the ground surface. The ground surface 108 is above a subterranean structure 102 that contains at least one subterranean element 106 of interest (e.g., hydrocarbon reservoir, freshwater aquifer, gas injection zone, etc.). One or more seismic sources 104, which can be vibrators, air guns, explosive devices, and so forth, are deployed in a survey field in which the sensor assemblies 100 are located.

Activation of the seismic sources 104 causes seismic waves to be propagated into the subterranean structure 102. Alternatively, instead of using controlled seismic sources as noted above to provide controlled source or active surveys, some embodiments can also be used in the context of passive surveys. Passive surveys use the sensor assemblies 100 to perform one or more of the following: (micro)earthquake monitoring; hydro-frac monitoring where microearthquakes are observed due to rock failure caused by fluids that are actively injected into the subsurface, such as a hydrocarbon reservoir; and so forth. Seismic waves reflected from the subterranean structure 102 (and from the subterranean element 106 of interest) are propagated upwardly towards the sensor assemblies 100. Seismic sensors 112 (e.g., geophones, accelerometers, etc.) in the corresponding sensor assemblies 100 measure the seismic waves reflected from the subterranean structure 102. Moreover, the sensor assemblies 100 further include divergence sensors 114 that are designed to measure noise, such as ground-roll noise or other types of noise. The data from the divergence sensors 114 can be employed to develop a noise reference model to attenuate noise in the measured seismic signals.

In one embodiment, the sensor assemblies 100 are interconnected by an electrical cable 110 to a controller 116. Alternatively, instead of connecting the sensor assemblies 100 by the electrical cable 110, the sensor assemblies 100 can communicate wirelessly with the controller 116. In some implementations, intermediate routers or concentrators may be provided at intermediate points of the network of sensor assemblies 100 to enable communication between the sensor assemblies 100 and the controller 116.

The controller 116 shown in FIG. 1 further includes processing software 120 that is executable on a processor 122. The processor 122 is connected to storage media 124 (e.g., one or more disk-based storage devices and/or one or more memory devices). In the example of FIG. 1, the storage media 124 is used to store seismic sensor data 126 communicated from the seismic sensors 112 of the sensor assemblies 100 to the controller 116, and to store divergence data 128 communicated from the divergence sensors 114 of the sensor assemblies 100.

In operation, the software 120 is used to process the seismic sensor data 126 and the hydrophone data 128. The hydrophone data 128 is combined with the seismic sensor data 126, using techniques discussed further below, to attenuate noise in the seismic sensor data 126 (to produce a cleansed version of the seismic sensor data). The software 120 can then produce an output to characterize the subterranean structure 102 based on the cleansed seismic sensor data 126.

Figure 2:
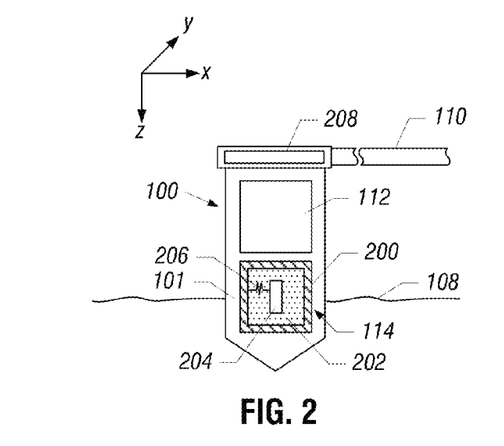
FIG. 2 illustrates a sensor assembly according to an embodiment that can be employed in the arrangement of FIG. 1.

A sensor assembly 100 according to some embodiments is depicted in greater detail in FIG. 2. The seismic sensor 112 in the sensor assembly can be a geophone for measuring particle velocity induced by seismic waves in the subterranean structure 102, or alternatively, the seismic sensor 112 can be an accelerometer for measuring acceleration induced by seismic waves propagated through the subterranean structure 102.

In some embodiments, the seismic sensor 112 is a vertical component seismic sensor for measuring seismic waves in the vertical direction (represented by axis z in FIG. 1). In alternative embodiments, the sensor assembly 100 can additionally or alternatively include seismic sensors for detecting seismic waves in generally horizontal directions, such as the x or y directions that are generally parallel to the ground surface 108.

The divergence sensor 114 that is also part of the sensor assembly 100 (within a housing 101 of the sensor assembly 100) is used for measuring an input (e.g., noise) different from the seismic waves propagated through the subterranean structure 102 that are measured by the seismic sensor 112. In an alternative embodiment, the divergence sensor 114 of the sensor assembly 100 can be physically spaced apart from the seismic sensor 112 by some predetermined distance.

The divergence sensor 114 has a closed container 200 that is sealed. The container 200 contains a volume of liquid 202 (or other material such as a gel or a solid such as sand or plastic) inside the container 200. Moreover, the container 200 contains a hydrophone 204 (or other type of pressure sensor) that is immersed in the liquid 202 (or other material). The pressure sensor being immersed in the material means that the pressure sensor is surrounded by or otherwise attached to or in contact with the material. In the ensuing discussion, reference is made to the hydrophone 204 that is immersed in the liquid 202—note that in alternative embodiments, other types of pressure sensors can be immersed in other types of material. The hydrophone 204, which is neutrally buoyantly immersed in the liquid 202, is mechanically decoupled from the walls of the container 200. As a result, the hydrophone 204 is sensitive to just acoustic waves that are induced into the liquid 202 through the walls of the container 200. To maintain a fixed position, the hydrophone 204 is attached by a coupling mechanism 206 that dampens propagation of acoustic waves through the coupling mechanism 206.

Examples of the liquid 202 include the following: kerosene, mineral oil, vegetable oil, silicone oil, and water. In other embodiments, other types of liquids can be employed. A liquid with a higher viscosity can be used to change the sensitivity to different types of waves, including P (compression) waves, S (shear) waves, Rayleigh waves, and Love waves. Moreover, the amount of liquid 202 provided in the container 200 of the divergence sensor 114 determines the sensitivity of the hydrophone 204. A container 200 that is only partially filled with liquid records a weaker signal. In some embodiments, the container 200 can be partially filled with liquid to provide an expansion volume within the container 200. Expansion of the liquid 202, such as due to a temperature rise of the liquid 202, can be accommodated in the expansion volume (which can be filled with a gas).

As further shown in FIG. 2, the sensor assembly 100 also includes electronic circuitry 208 that is electrically coupled to both the seismic sensor 112 and the divergence sensor 114. The electronic circuitry 208 can include storage elements, processing elements, and communications elements for communicating data acquired by the seismic sensor 112 and divergence sensor 114 over the electrical cable 110 to the controller 116 (FIG. 1).

As depicted in FIG. 2, the seismic sensor 112 is positioned above and external to the container 200 of the divergence sensor 114. Alternatively, the seismic sensor 112 can have some other arrangement with respect to the divergence sensor 114. At least a portion of the divergence sensor 114 is below the ground surface 108, such that the hydrophone 204 is at or below the ground surface 108, but not above the ground surface 108. When planted, the divergence sensor 114 of the sensor assembly 100 is firmly in contact with the earth medium underneath the ground surface 108, which improves data quality of signals acquired by the hydrophone 204 in the divergence sensor 114.

In embodiments that employ the cable 110, power is provided from a remote power supply (such as a power supply located at the controller 116) through the cable 110 to the sensor assemblies 100. In embodiments that employ wireless communications and that do not use the cable 110, the sensor assembly 100 can be provided with batteries to provide local power.

Figure 3A:
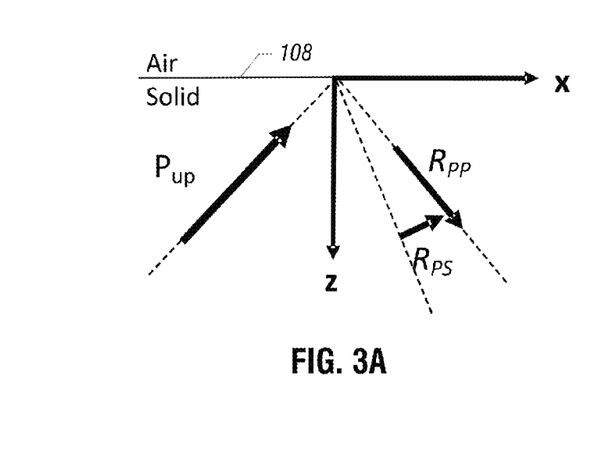
FIGS. 3A-3B are graphs illustrating propagation of wavefields that are detectable by a sensor assembly according to an embodiment.
Figure 3B:
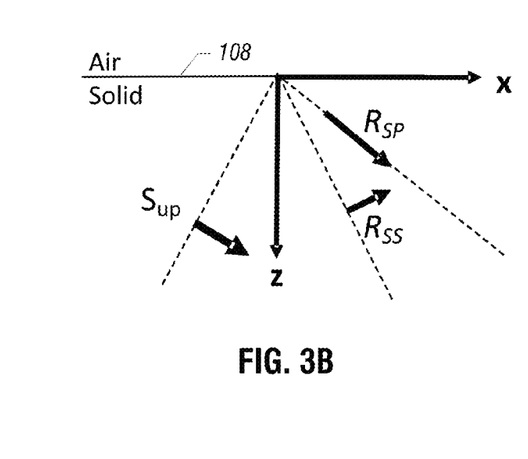

In land-based seismic surveying, particle displacement (or velocity or acceleration) is measured by seismic sensors just below the free surface (ground surface 108). As a result, the observed signal components contain not only the impinging-upcoming seismic waves but also the additional contribution of downwardly reflected/converted waves at the solid-air interface (ground surface 108). FIG. 3A shows an example of an incoming compression or P wave, and FIG. 3B shows an example for an incoming shear or S wave. The P and S waves are incoming from the subterranean structure 102 (FIG. 1). A P wave extends in the direction of propagation of the seismic wave, whereas an S wave extends in a direction generally perpendicular to the direction of propagation of the seismic wave.

In each of FIGS. 3A and 3B, the z direction represents the vertical direction, while the x direction represents the inline horizontal direction. The air-solid interface corresponds to the ground surface 108 shown in FIG. 1. An upcoming P wave is represented as $P_{up}$ (FIG. 3A), while an upcoming S wave is represented as $S_{up}$ (FIG. 3B). A seismic sensor 112 records not only the upcoming P or S waves, but also the additional contribution of the downwardly reflected/converted waves at the solid-air interface, including the $R_{PP}$ and $R_{PS}$ waves (FIG. 3A), which are reflected in response to the $P_{up}$ wave. Similarly, the reflected/converted waves that are reflected from the $S_{up}$ wave is represented as $R_{SP}$ and $R_{SS}$ in FIG. 3B.

The $R_{PP}$ wave is a P wave reflected from the $P_{up}$ wave, while the $R_{PS}$ wave is a reflected S wave from the $P_{up}$ wave. Similarly, $R_{SP}$ is the reflected P wave from the $S_{up}$ wave, and $R_{SS}$ is a reflected S wave from the $S_{up}$ wave.

In contrast to the seismic sensor 112, the hydrophone 204 inside the container 200 filled with liquid 202 in the sensor 114 shown in FIG. 2 is insensitive to the direction and angle of propagation of waves. As a result, this leads to a destructive summation of events at a near vertical incidence angle (small slowness), and thus, the measurement of the hydrophone 204 (represented as $U_H$) records mainly surface noise (which has large slowness). Slowness is proportional to the inverse of apparent velocity—small slowness results from high apparent velocity, while large slowness results from small apparent velocity. Thus, $U_H$ (which is the data from the hydrophone 204 in the divergence sensor 114 of FIG. 2) provides a better representation of noise than $U_x$ (the x component of seismic data measured by a seismic sensor.) As a result, $U_H$ can be used for noise removal on $U_z$, based on adaptive subtraction and/or polarization. $U_z$ refers to the measured seismic wave in the z direction. In the ensuing discussion, $U_x$, $U_z$, and $U_H$ are assumed to measure particle displacement or velocity or acceleration or pressure just below the free surface.

$U_z$ and $U_x$ are represented according to Eqs. 1 and 2 below:

$$U_z = (-q_\alpha \alpha + R_{PP} q_\alpha \alpha - R_{PS} p \beta) P_{up} + (p\beta - R_{SS} p\beta + R_{SP} q_\alpha \alpha) S_{up}, \quad \text{(Eq. 1)}$$

$$U_x = (p\alpha + R_{PP} p\alpha + R_{PS} q_\beta \beta) P_{up} + (q_\beta \beta + R_{SS} q_\beta \beta + R_{SP} p\alpha) S_{up}, \quad \text{(Eq. 2)}$$

where $P_{up}$ and $S_{up}$ are the incident P and S waves (respectively, as shown in FIGS. 3A-3B), $\alpha$ and $\beta$ are the near-surface P- and S-wave velocities, and $p = \sin i/\alpha = \sin j/\beta$ is horizontal slowness. The vertical slownesses for P- and S-waves are $q_\alpha = (\alpha^{-2} - p^2)^{0.5}$ and $q_\beta = (\beta^{-2} - p^2)^{0.5}$, respectively. The $R_{ij}$ terms are the reflection/conversion coefficients for an incident i wave backward reflected/converted into a j wave at the solid-air interface just above the sensors. The left hand side of each of Eqs. 1 and 2 relates the free-surface effect considering an incident P wave as illustrated in FIG. 3A, while the right hand side of each of Eqs. 1 and 2 relates the free-surface effect considering an incident S wave as illustrated in FIG. 3B. Note that seismic sensor (geophone or accelerometer) signal components are vectorial measurements—for example, if the incoming P wave case is considered on the z component, the + and − in the left hand side of each of Eqs. 1 and 2 relates the direction of propagation, i.e. upgoing (−) or downgoing (+), while the terms $q_\alpha \alpha$ (=cos i) or $p\beta$ (=sin j) relate to the propagation angles, where i and j are propagation angles (with respect to the vertical) of P and S waves, respectively.

In contrast to the seismic sensors 112 (FIG. 2) that record both P and S waves in a vectorial manner, a hydrophone (204 in FIG. 2) in a liquid cell will only record the pressure fluctuation due to the P wavefield since S wave propagation is not supported by liquid. In addition, such a sensor (divergence sensor 114) is assumed to be insensitive to the direction of propagation, since pressure is a scalar quantity. Therefore, compared to the seismic sensor data represented by Eqs. 1 and 2, the angle-direction related terms vanish for the case of a full isotropic hydrophone sensor, and the hydrophone data $U_H$ can be written as:

$$U_H = C_1(P_{UP} + R_{PP}P_{up} + R_{SP}S_{up}), \quad \text{(Eq. 3)}$$

where $C_1$ is a constant that includes (1) a calibration factor to compensate for the difference in sensitivity between the hydrophone 204 (that measures pressure) and the seismic sensors 112 (that measure displacement or velocity or acceleration), and (2) a transmission factor from the ground into the container of the divergence sensor 114. The hydrophone 204 does not directly record S waves, but note that S wavefield related energy will be present in the hydrophone data due to the S-to-P conversion at the free surface (last term of Eq. 3). Finally, by including into Eq. 3 the $P_{up}$ and $S_{up}$ expressions as a function of $U_z$ and $U_x$ as well as the expressions for the reflection coefficients, the following is obtained:

$$U_H = C_2 p U_x, \quad \text{(Eq. 4)}$$

where $C_2$ depends on $C_1$ and on the near-surface properties in the vicinity of the receiver.

In the slowness domain, $U_H$ is just a p-dependent (p represents slowness) scaled version of $U_x$. This means that, at small slowness (small p), or equivalently at small incident angles, wave amplitudes on the $U_H$ component are extremely small, even compared to $U_x$. This is true for S waves as well as for P waves. This natural P wave attenuation on $U_H$ is due to the destructive summation between the upgoing and downgoing reflected events, $R_{PP}$ being equal to −1 at vertical incidence (p=0). In summary, the hydrophone 204 acts as a natural velocity filter, by attenuating small slownesses (high apparent velocity like reflections) much more than larger slownesses (slow apparent waves, typically ground-roll noise).

By rewriting Eq. 4 (in the slowness domain) into the conventional time-offset domain (with $p = \delta x/\delta t$), the following is obtained:

$$\frac{\delta U_H(t,x)}{\delta t} = C_2 \frac{\delta U_x(t,x)}{\delta x}. \quad \text{(Eq. 5)}$$

The above inline (2D) case can be extended to the 3-dimensional case as:

$$\frac{\delta U_H}{\delta t} \propto \left( \frac{\delta U_x}{\delta x} + \frac{\delta U_y}{\delta y} \right). \quad \text{(Eq. 6)}$$

The time derivative of the hydrophone signal component $U_H$, represented by Eq. 6, is proportional to the divergence of the wavefield (just below the free-surface).

Figure 4A:
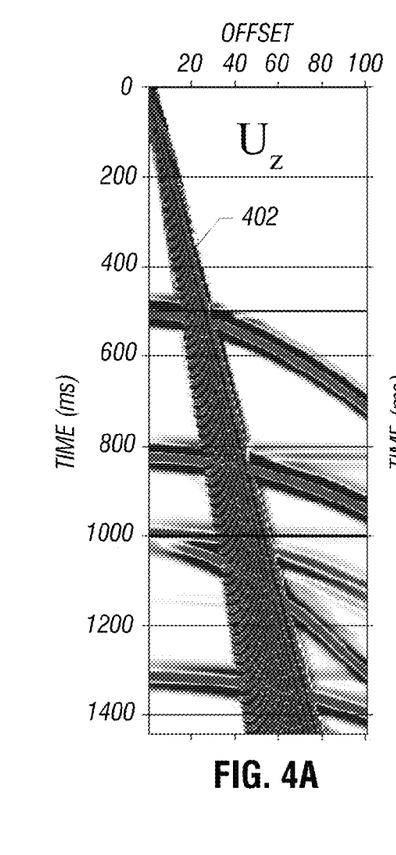
FIGS. 4A-4C are graphs illustrating data in the time-offset domain as acquired by sensor assemblies according to some embodiments.
Figure 4B:
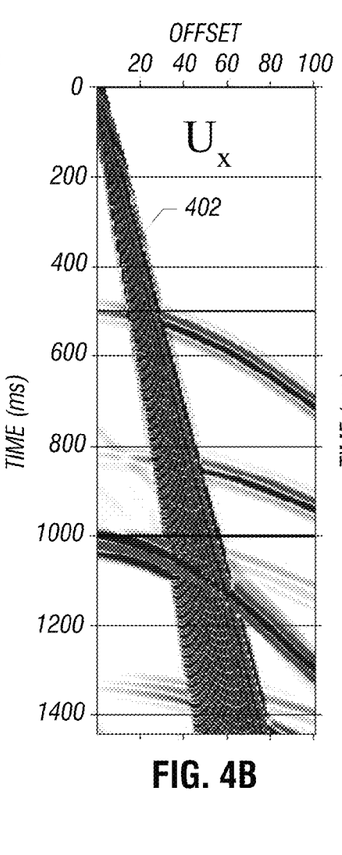
Figure 4C:
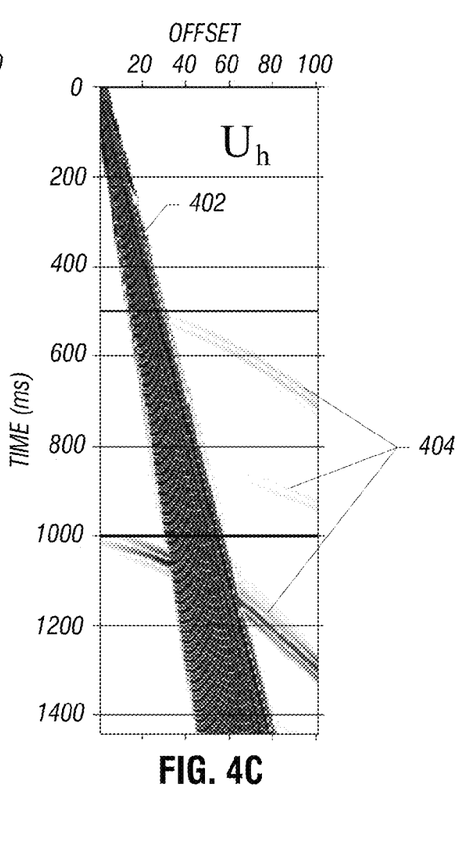

FIGS. 4A-4C show simulated data in the time-offset domain, in which offset refers to the distance between each sensor assembly 100 and a seismic source. FIG. 4A shows the time-offset simulated data for $U_z$, FIG. 4B shows the time-offset simulated data for $U_x$, and FIG. 4C shows the time-offset simulated data for $U_H$. A generally cone-shaped pattern 402 in each of the FIGS. 4B-4C represents noise. Note that the noise appears in each of $U_z$, $U_x$, and $U_H$. However, the actual seismic data (represented by the curved structures in FIGS. 4A-4C) is attenuated in $U_H$ especially at small offsets. Therefore, it is apparent that the hydrophone 204, which outputs $U_H$, provides natural velocity filtering.

Body waves, and especially reflected P waves at small offset have even smaller amplitude on $U_H$ than on $U_x$, in contrast to the ground-roll cone 402. Therefore $U_H$ provides a better noise reference model than $U_x$ for ground-roll attenuation on $U_z$. In addition, $U_H$ is a better noise model than $U_x$ (or more generally an orthogonal or near-orthogonal component to the recorded seismic data by the seismic sensor) because $U_H$ records also offline scattered events (present on $U_z$ and $U_y$, in contrast to $U_x$).

Global ground-roll noise correlation between $U_H$ and $U_z$ should be better than that between $U_x$ and $U_z$ because S waves and Love waves are weaker on $U_H$ than on $U_x$. As a result, $U_H$ can be used to provide better noise attenuation on $U_z$ based on adaptive subtraction or polarization filtering. Secondly signal preservation should be improved by taking the $U_H$ instead of $U_x$, because $U_H$ contains less body wave energy (especially at small slowness-offset where ground-roll noise is dominant).

Weighted HZ summation (summation of the $U_H$ and $U_z$ signal components) enables the removal of noise from $U_z$. Basic adaptive subtraction can be written as:

$$U_z^{clean}(t,x) = U_z(t,x) - F(t,x) \cdot U_H(t,x), \quad (Eq.\ 7)$$

where F can be a scalar or a frequency dependent operator estimated for example by matching $U_H$ with $U_z$ in varying time-offset windows (and for example in the least square sense). In Eq. 7 above, $U_z^{clean}$ represents the seismic data with the noise component removed.

F(t,x) is an operator, which can be a wavelet of several point length in the general case, or simply a number (scalar) in the special case where filter length=1. In this latter case, the number F is simply obtained by dividing $U_z$ by $U_H$ in a selected time-offset window: $F(x,t)=Z(x,t)/H(x,t)$. F is frequency independent, since it is just the scaling factor between $U_H$ and $U_z$ (again in a specific time-offset window).

More generally, when considering the general case, F(t,x) can be called a Wiener filter or a transfer function between $U_H$ and $U_z$, and F(t,x) becomes frequency dependent. In such case, the F(t,x) estimation is based on the use of cross-correlation and auto-correlation of Z(x,t) and H(x,t). Numerous other algorithms can be used to estimate F, such as solving for F in a L1 norm or L2 norm and least squares. Other suitable methods to design and apply the filter operator F include polarization, adaptive, statistical, deterministic, multi-channel and multi-dimensional filtering techniques.

Although reference has been made to cleansing the $U_z$ seismic signals (seismic signal components in the z direction), it is noted that the divergence sensor output $U_H$ can also be used to cleanse the seismic signal components $U_x$ or $U_y$ horizontal directions.

By employing the noise attenuation technique according to some embodiments, the spacing between sensor assemblies can be increased. For example, the spacing between adjacent sensor assemblies can be provided such that the sensor assemblies are spaced apart from each other by a distance larger than half a shortest wavelength of noise recorded by the divergence sensors. As a result, a less dense array of sensor assemblies has to be deployed, which reduces equipment costs, and reduces labor costs associated with deployment of the sensor assemblies in the field.

FIG. 2 depicts a divergence sensor 114 with a generally cuboid container 200. The shape of the container 200 can be changed to another shape, such as the following shapes: parallelepiped shape, pyramid shape, quadrilateral frustum shape, dipyramid shape, ellipsoid shape, and spherical shape. Varying the shape of the container 200 introduces anisotropy, which can yield wavefield decomposition opportunities (such as to decompose into P and S waves).

Instead of immersing the hydrophone 204 (FIG. 2) in a liquid, the hydrophone 204 can instead be immersed in a more viscous fluid (e.g., silicone oil), a gel, or even a solid such as sand or plastic, to allow for S wave detection. This may allow for decomposition of wavefields, such as P versus S waves, or Rayleigh versus Love waves.

Figure 5:
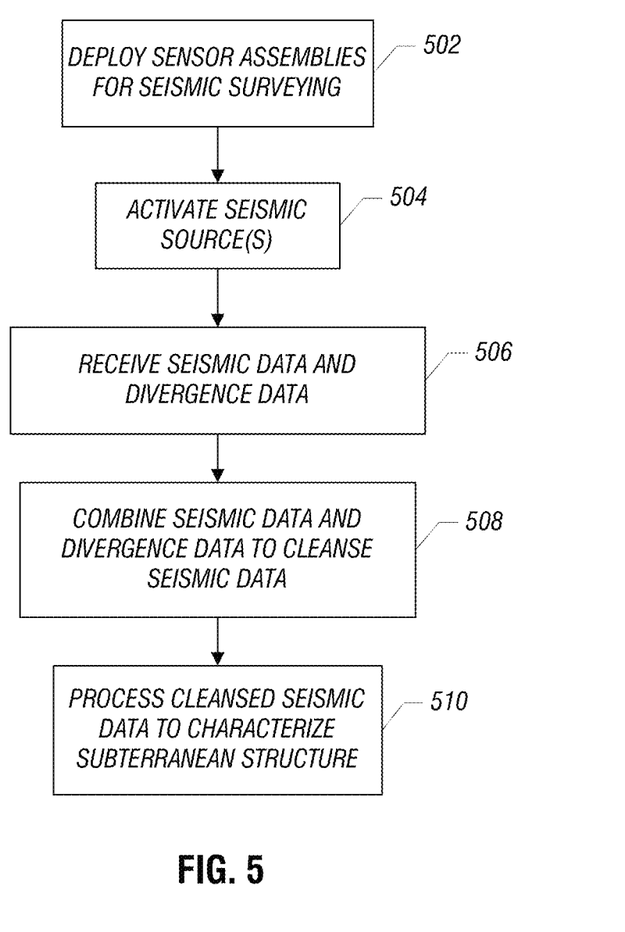
FIG. 5 is a flow diagram of a process of performing seismic surveying, according to an embodiment.

FIG. 5 illustrates a general process according to an embodiment for performing a seismic survey. Sensor assemblies 100 are deployed (at 502) for performing the seismic surveying. One or more seismic sources (e.g., 104 in FIG. 1) are then activated (at 504). In response to activation of the seismic source(s), seismic waves are propagated into the subterranean structure 102 (FIG. 1). Reflected seismic waves are detected by the sensor assemblies 100.

The seismic data (measured by seismic sensors 112) and divergence data (measured by the divergence sensors 114) are received (at 506) by the controller 116. The controller 116 then combines (at 508) the seismic data and divergence data to cleanse the seismic data, such as according to Eq. 7. The cleansed seismic data is then processed (at 510) by the controller 116 to characterize the subterranean structure 102. Note that the combination of the seismic measurement and divergence measurement may be carried out by a central control unit after receiving the data from the sensor, or locally inside the electronics in the sensor unit in FIG. 2 or at any intermediate location. The combination may be carried out in real time, after each shot, after completion of the survey or later in a data processing center.

The noise attenuation technique or system according to some embodiments can be employed in a survey arrangement that has obstructions, such as buildings or natural obstructions that prevent placement of sensor assemblies at regular spacings. In other words, the obstructions disturb the regular pattern of sensor assemblies. By using the noise attenuation technique according to some embodiments based on use of divergence sensors, better results can be obtained.

Instructions of software described above (including software 120 of FIG. 1) are loaded for execution on a processor (such as processor 122 in FIG. 1). The processor includes microprocessors, microcontrollers, processor modules or subsystems (including one or more microprocessors or microcontrollers), or other control or computing devices. A "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of noise attenuation for land-based seismic surveying, comprising:
   deploying a sensor assembly at a ground surface, wherein the sensor assembly has a seismic sensor to measure seismic waves reflected from a subterranean structure in response to seismic waves transmitted due to activation of at least one seismic source, and a divergence sensor comprising a pressure sensor to measure ground-roll noise, wherein the divergence sensor includes a container containing a material and the pressure sensor immersed in the material, and the divergence sensor is insensitive to a direction of wave propagation, and wherein the divergence sensor is buried below the ground surface and a portion of the sensor assembly including the divergence sensor is in contact with an earth medium underneath the ground surface;

receiving first data representing the reflected seismic waves from the seismic sensor and second data representing the ground-roll noise from the divergence sensor, the first data representing measurements along two or more axes, and the second data comprising measurements insensitive to a direction of wave propagation; and combining the first data and the second data to attenuate ground-roll noise in the first data.

2. The method of claim 1, wherein the seismic sensor and divergence sensor are physically spaced apart by a predetermined distance.

3. The method of claim 1, wherein combining the first data and the second data comprises subtracting the second data from the first data.

4. The method of claim 3, wherein subtracting the second data from the first data comprises subtracting a product of the second data and a filter operator from the first data.

5. The method of claim 1, wherein the material is selected from the group consisting of a liquid, a gel, and a solid.

6. The method of claim 1, wherein the second data from the divergence sensor provides a better noise model than a component orthogonal to, or near-orthogonal to, the first data from the seismic sensor.

7. The method of claim 1, further comprising deploying additional sensor assemblies on the ground surface, where each of the additional sensor assemblies has a seismic sensor to measure seismic waves reflected from the subterranean structure, and a divergence sensor to measure noise.

8. The method of claim 7, wherein deploying the sensor assemblies comprises deploying the sensor assemblies in an environment that includes one or more obstructions that disturbs a regular pattern of the sensor assemblies, wherein provision of the divergence sensors enable noise attenuation even without the regular pattern of the sensor assemblies.

9. The method of claim 8, wherein deploying the sensor assemblies comprises providing sensor assemblies that are spaced apart from each other by a distance larger than half a shortest wavelength of noise recorded by the divergence sensors.

10. The method of claim 1, wherein deploying the sensor assembly comprises deploying the sensor assembly having a housing containing the seismic sensor and the divergence sensor.

11. A system comprising:
a controller having a processor to receive data collected by sensor assemblies deployed at a ground surface, where each of the sensor assemblies has a seismic sensor to measure seismic waves reflected from a subterranean structure, and a divergence sensor comprising a pressure sensor to measure ground-roll noise, wherein the divergence sensor includes a container containing a material and the pressure sensor immersed in the material, and the divergence sensor is insensitive to a direction of wave propagation, and wherein the divergence sensor is buried below the ground surface and a portion of the sensor assembly including the divergence sensor is in contact with an earth medium underneath the ground surface, wherein the processor is configured to combine first data representing the reflected seismic waves from the seismic sensors with second data representing the ground-roll noise from the divergence sensors to attenuate ground-roll noise in the first data from the seismic sensors, the first data representing measurements along two or more axes, and the second data comprising measurements insensitive to a direction of wave propagation.

12. The system of claim 11, wherein the material is selected from the group of a liquid, a gel, and a solid.

13. The system of claim 11, wherein, in each of the sensor assemblies, the seismic sensor is provided above and external to the container of the divergence sensor.

14. The system of claim 11, wherein the controller is configured to communicate over a cable with the sensor assemblies.

15. The system of claim 11, wherein the controller is configured to communicate wirelessly with the sensor assemblies.

16. The system of claim 11, wherein combining the first data and the second data comprises subtracting the second data from the first data.

17. The system of claim 16, wherein subtracting the second data from the first data comprises subtracting a product of the second data and a filter operator from the first data.

18. The system of claim 11, wherein at least one of the sensor assemblies has a housing containing the corresponding seismic sensor and the corresponding divergence sensor.

19. An article comprising at least one non-transitory computer-readable storage medium containing instructions that upon execution cause a system having a processor to:
receive data collected by sensor assemblies arranged at a ground surface, where each of the sensor assemblies has a seismic sensor to measure seismic waves reflected from a subterranean structure, and a divergence sensor comprising a pressure sensor to measure ground-roll noise, wherein the divergence sensor includes a container containing a material and the pressure sensor immersed in the material, and the divergence sensor is insensitive to a direction of wave propagation, and wherein the divergence sensor is buried below the ground surface and a portion of the sensor assembly including the divergence sensor is in contact with an earth medium underneath the ground surface; and
combine first data representing the reflected seismic waves from the seismic sensors with second data representing the ground-roll noise from the divergence sensors to attenuate ground-roll noise in the first data from the seismic sensors, the first data representing measurements along two or more axes, and the second data comprising measurements insensitive to a direction of wave propagation.

20. The article of claim 19, wherein combining the first data and the second data comprises subtracting the second data from the first data.

21. The article of claim 19, wherein at least one of the sensor assemblies has a housing containing the corresponding seismic sensor and the corresponding divergence sensor.

* * * * *